April 21, 1970 R. J. KAVANAUGH 3,508,091
DOUBLE CLAW TOOTH STATOR SYNCHRONOUS AND
STEPPING MOTOR WITH INDICATOR
Filed Dec. 26, 1967 4 Sheets-Sheet 1

INVENTOR.
RICHARD J. KAVANAUGH
BY
ATTORNEY

April 21, 1970

R. J. KAVANAUGH 3,508,091

DOUBLE CLAW TOOTH STATOR SYNCHRONOUS AND
STEPPING MOTOR WITH INDICATOR

Filed Dec. 26, 1967

INVENTOR.
RICHARD J. KAVANAUGH
BY
Donald Phillett
ATTORNEY

FIG. 6
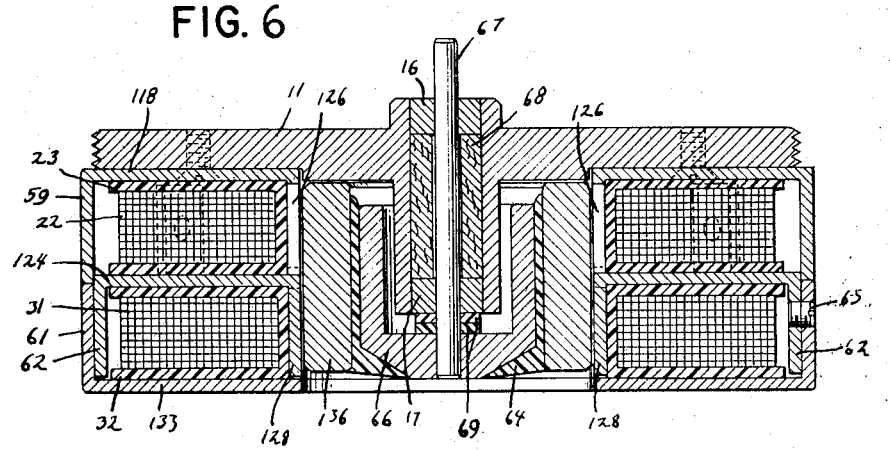
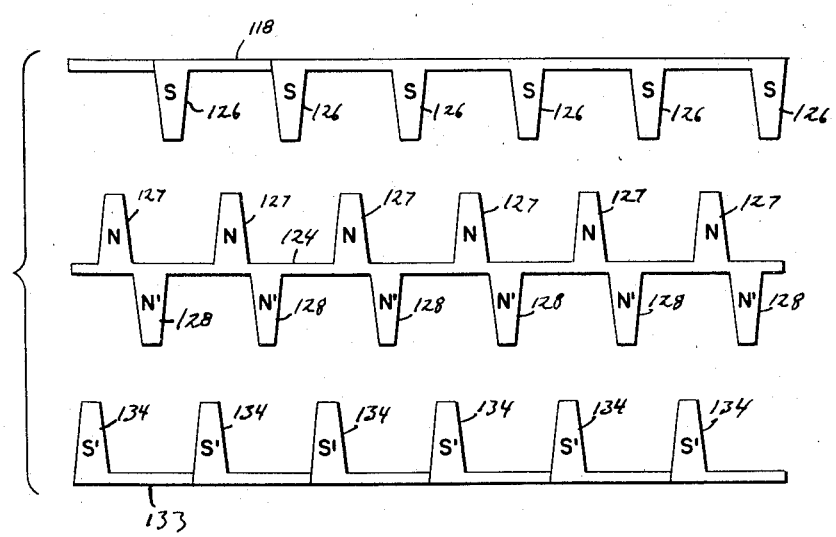
FIG. 7
INVENTOR
Richard J. Kavanaugh
BY
ATTORNEY

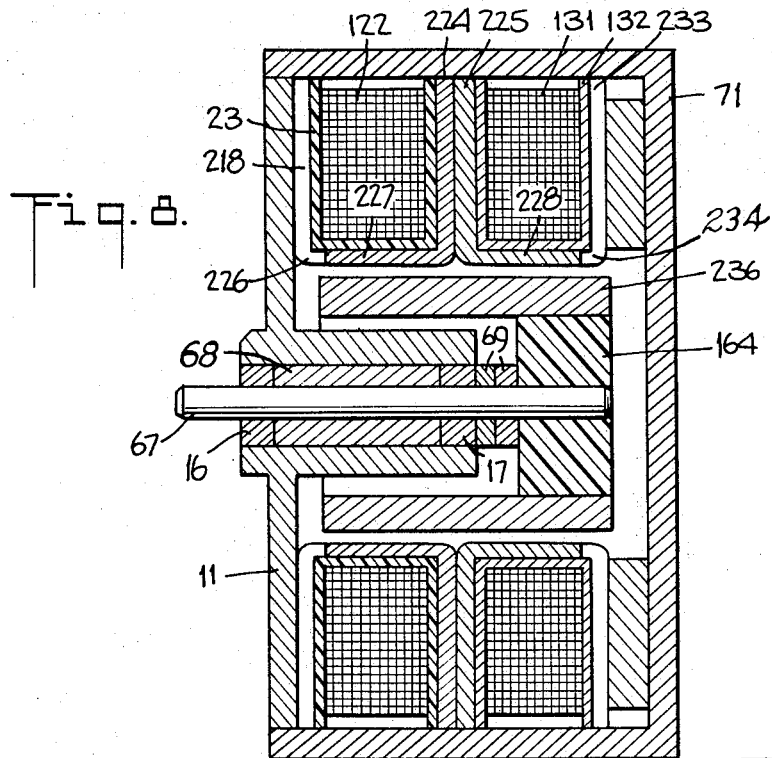
Fig. 8.
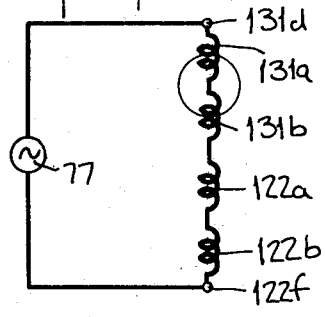
Fig. 10A.
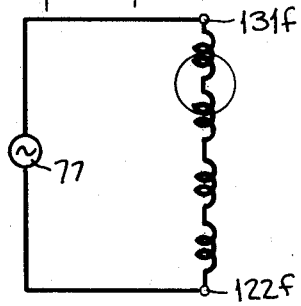
Fig. 10B.
Fig. 9B.
Fig. 9A.
INVENTOR.
RICHARD J. KAVANAUGH
BY
ATTORNEYS

United States Patent Office 3,508,091
Patented Apr. 21, 1970

3,508,091
DOUBLE CLAW TOOTH STATOR SYNCHRONOUS AND STEPPING MOTOR WITH INDICATOR
Richard J. Kavanaugh, Bristol, Conn., assignor to North American Philips Corporation, New York, N.Y., a corporation of Delaware
Continuation-in-part of application Ser. No. 402,830, Oct. 9, 1964. This application Dec. 26, 1967, Ser. No. 693,617
Int. Cl. G08b 5/00; H02k 21/00, 37/00
U.S. Cl. 310—49
20 Claims

ABSTRACT OF THE DISCLOSURE

A synchronous and stepping motor with two stator sections, each having a plurality of interleaved claw tooth stator poles energized by a stator coil so that alternate poles are of opposite polarity. The stator sections are arranged end-to-end along a common axis and the poles of each section are angularly spaced apart by commensurate amounts, the poles of one section being angularly displaced with respect to the poles in the other section. The rotor is permanently magnetized to have magnetic poles angularly spaced apart commensurately with the poles in the stator sections, and the coils are so energized as to produce out-of-phase magnetic fields to rotate the rotor. The phase displacement of the magnetic fields may result from applying out-of-phase alternating currents or properly timed current pulses to the coils of the two stator sections, or it may result from the shading effect of a conductive coil form in one stator section. An outer cylindrical shell with indicia is provided on the rotor whereby the indicia may be viewed through an aperture in the cover.

---

This is a continuation-in-part of my application, Ser. No. 402,830, filed on Oct. 9, 1964, now abandoned.

This invention relates to an electric synchronous and stepping motor having two multi-pole stator sections and a common rotor. In particular, the invention relates to a motor suitable for both stepping operation to provide a direct reading of the number of steps through which the rotor has rotated from an initial position and synchronous operation, and capable of running in either direction for both types of operation.

The present motor comprises a stator made up of a pair of coils which may be center-tapped or bifilar wound, mounted substantially side by side on a common axis. Each coil has a number of ferromagnetically soft stator poles spaced around its perimeter and divided into two sets, both of which are magnetically linked to the coil so that all of the poles of one set are of one magnetic polarity when the coil is energized by a direct current and all of the poles of the other set are of the opposite magnetic polarity under the same condition. Each set has an equal number of poles and the individual poles of the two sets are interleaved with each other. In addition, the sets of stator poles for one coil are displaced electrically from the sets of stator poles for the other coil to provide, in effect, a rotating field. One centertapped or bifilar coil may be wound in a copper bobbin to produce flux delay for generating a rotating field from single-phase A.C. The rotor is permanently magnetized and is divided into individual pole areas of alternate north and south polarity. The total number of these pole areas is equal to the total number of stator poles for one of the coils, or twice the number of stator poles in one of the sets.

While the motor of this invention may be operated simply as a motor with a mechanical output from the rotor shaft, it is also particularly adapted for use as a counter by placing numerals around the outer surface of the rotor which, in turn, surrounds the stator poles. The mechanism may then be placed behind a screen so that only one number at a time will be visible, thus indicating by that number the extent to which the rotor has rotated from an initial position. More than one counter motor may be used at a time in order to provide an indication having more than one digit. For example, six counter motors might be aligned along a common axis to give a six-digit readout similar to that shown on standard mechanical counters. However, a counter using several motors of the type under consideration has the advantage that each digit could be separately controlled to permit the addition or subtraction almost instantaneously of a relatively large multi-digit number.

It is a principal object of this invention to provide an improved motor of simplified form having, basically, a stepping operation. Further objects are to provide an external rotor stepping motor of simple construction especially suited for use as a numerical counter indicator and to provide a multi-digit counter made up of a group of such motors.

Further objects will become apparent from the following specification, together with the drawings in which:

FIG. 6 shows a cross-sectional view of another embodiment of the motor having a rotor within the ring of stator poles;

FIG. 7 is a developed view of the stator poles of the motor of FIG. 6;

FIG. 8 is another embodiment of the motor;

FIGS. 9a and 9b show the motor of FIG. 8 connected as a stepper; and

FIGS 10a and 10b show the motor of FIG. 8 connected as a synchronous motor.

Figures 1, 2:
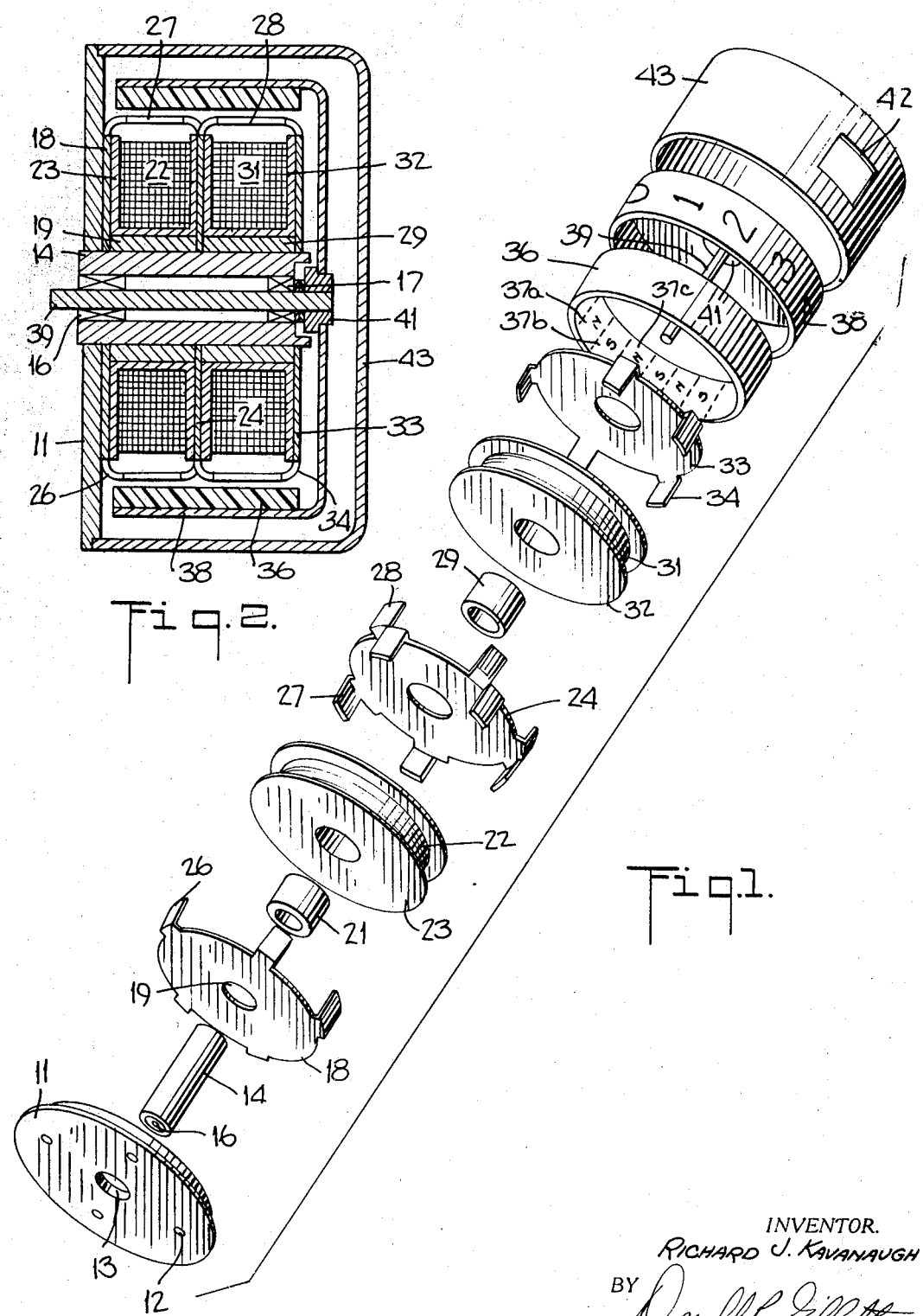
FIG. 1 is an exploded view of the motor of the present invention.
FIG. 2 is a cross-sectional view of the motor of FIG. 1.

The parts of the motor FIG. 1 have been separated along the axis to clarify their relationship to each other. The first part is a base 11 on which the stator elements are mounted, and having mounting holes 12 and a central aperture 13 within which a soft, steel core 14 may be firmly gripped. The core is normally hollow and has a bearing 16 visible at one end and a similar bearing, which is not shown in this drawing, at the other other end to support the rotor shaft. The core 14 forms a support for a soft, steel disc 18 having a central aperture 19 having a diameter that fits snugly on the core 14 to provide good magnetic coupling between the two. If desired, a short, hollow, cylindrical, soft steel core 21 may also be slipped over the main core 14 and up against the back surface of the disc 18. This short core serves in part as a low-reluctance support for a short cylindrical coil 22 wound on a coil form 23 and, in part, as a spacer to separate a second disc 24 from the first disc 18. Preferably, the axial length of the core 21 is substantially equal to the axial length of the coil form 23.

The disc 18 has a set of substantially equally spaced, identical, stator poles 26 formed in its outer perimeter and bent so as to lie substantially parallel to the axis of the motor and just outside of the coil 22. These stator poles 26 may be formed by bending radial projections from the disc 18 and may be further improved by shaping the projections so that they are small portions of a cylinder. The purpose of the disc 18 is to provide good magnetic coupling between the coil 22 and the stator poles 26 and, for this purpose, the diameter of the disc should be approximately equal to the diameter of the coil form 23. However, under certain circumstances it may be desirable to make the diameter of the disc 18 somewhat less than the diameter of the coil form, in which case the stator poles 26 would have to extend radially out to clear the coil form 23 and the coil 22.

The second disc 24 is similar to the first disc 18, except that instead of having one set of stator poles 27 it has an additional set 28 facing in the opposite direction. There are the same number of poles in the set 27 as in the set 26 and the disc 24 is so oriented with respect to the disc 18 that each of the poles 27 lies substantially midway between two of the poles 26. Preferably, also the poles 27 are shaped into a cylindrical form so as to lie on the same cylindrical surface as the poles 26, close to but just outside of the coil form 23 and the coil 22. Because of the fact that the disc 24 is at the opposite end of the coil 22 from the disc 18, a direct current flowing in the coil 22 will energize one of these discs to be a north magnetic pole and the other to be a south magnetic pole. Because of the direct magnetic connection between the poles 26 and the disc 18, these poles will assume the same magnetic polarity as the disc. Similarly, the poles 27 will assume the same magnetic polarity as the disc 24, which is the opposite polarity from that of the disc 18 and poles 26.

Behind the disc 24 is a second short, soft steel cylindrical core 29 corresponding to the core 21 and fitting snugly over the core 14. A second short, cylindrical coil 31 wound on a coil form 32 fits over the core 29 and within the stator poles 28. A third, soft steel disc 33 fits on the core 14 behind the core 29 and the coil form 32 and is provided with a set of stator poles 34 equal in number to the stator poles 28 and interleaved therewith so that each of the poles 34 is substantially equally spaced between two of the poles 28.

The poles 34 and 28 are equal in number to the poles 26 and 27, but are angularly displaced therefrom by about 90° electrically. In terms of mechanical spacing, the poles 28 and 27 may be formed originally as side by side outward projections from the disc 24 with one edge of each pole 28 adjacent to one edge of each pole 27, but with a space between the other edge of the pole 27 and the closest edge of the next pole 28. If the motor is to be used as a counter based upon the customary numbering system using the base "10," there will be five stator poles in each of the sets 26, 27, 28, and 34 and, preferably, each of the poles should be substantially equal in size and shape to each of the other poles of the same set and of the other sets. In that case, and in view of the fact that both of the sets of poles 27 and 28 may be formed from peripheral extensions of the same disc 24; and in view of the further fact that it is desirable to have all of the stator poles of all of the sets lie on the same cylindrical surface, each of the stator poles can have a maximum angular dimension of 18° mechanically. Thus, when the parts are assembled to interleave the poles 26 with the poles 27, there will be a space on each side of each pole and each of the spaces will be approximately of the same dimension as each of the poles. Of course, it may be desirable under certain circumstances to divide the disc 24 into two parts. In that case, there would not be the same limitation on the angular width of the poles and it would, in fact, be possible to make each of the poles in each of the sets twice as wide as the embodiment illustrated in FIG. 1.

The rotor comprises a pole section in the form of a permanently magnetized cylindrical ring 36 magnetized so that it has twice as many magnetic poles spaced around its inner circumference as the number of stator poles in one of the sets 26, 27, 28 or 34. Furthermore, it is desirable, for purposes of efficiency, to make each of the magnetic poles in the cylindrical rotor member 36 have as large a surface area as possible. These pole areas are indicated by reference numerals 37a, 37b, 37c, and so on and, as shown, are alternately north and south poles. In the case of a counter motor for numbers from zero to nine, there will be ten such rotor pole areas 37a–37j. It has been found that a very satisfactory material for forming the cylindrical rotor pole member 36 is a permanent magnetic material such as barium ferrite either flexible or ceramic having much the same magnetic properties as a hard ferrite.

The ring 36 may be a part of or may be placed within a non-ferromagnetic or ferromagnetic rotor shell 38 having a central rotor shaft 39 and an end disc 41 attached to the shaft 39 to be supported thereby and attached at its outer periphery to the cup, or rotor shell, 38. The outer cylindrical surface of the rotor shell 38, have numerals imprinted or otherwise placed thereon to be viewed through a slot 42 in an external cover 43.

FIG. 2 is a cross-sectional view of the motor of FIG. 1 in its assembled condition. As may be seen, the parts fit together compactly and the stator poles 26 and 27 lie side by side for most of their length, as do the poles 28 and 34. The length of the rotor, or at least the magnetized ring 36 thereof, is approximately equal to the total length occupied by the four sets of stator poles 26, 27, 28 and 34. This is about equal to the combined axial length of the two coil forms 23 and 32, plus the thickness of the disc 24, which is small in comparison to either of the coils.

As may been seen, the core 21 forms a good magnetic path through the coil 22 to join the discs 18 and 24, while the core 29 serves the same purpose for the coil 31 and the discs 24 and 33. The main core 14 further improves the magnetic circuit.

Figure 3A:
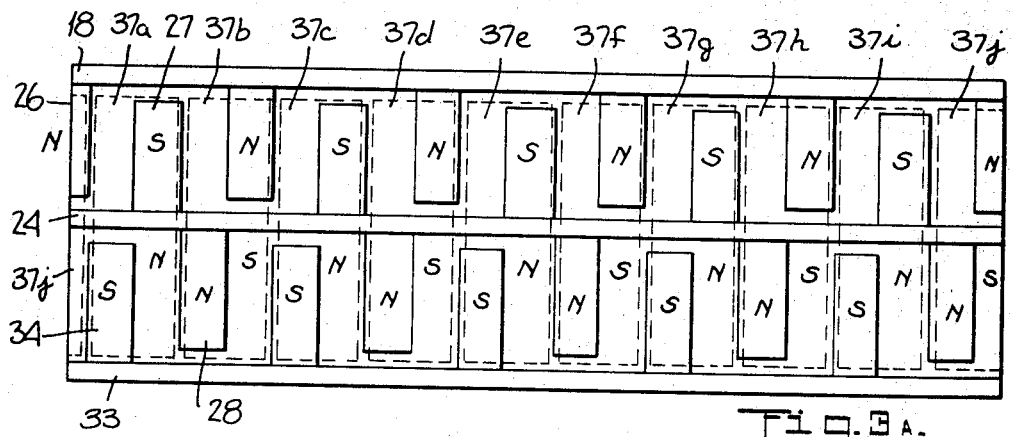
FIG. 3a shows a developed view of the pole arrangement of the motor of FIG. 1 and FIGS. 3b–3d show the progression of the rotor for successive reversals of energizing currents.

In order to illustrate more particularly the arrangement of the stator poles and the operation of the rotor, the poles for both the stator and the rotor are shown in a developed view in FIG. 3a. Here the edge of the disc 18 is shown with the pole 26 extending therefrom in the direction of the disc 24. The latter has poles 27 extending therefrom in one direction and poles 28 extending therefrom in the opposite direction toward the disc 33. The latter has poles 34 extending in a direction of the disc 24.

The poles 26 and 27 lie alongside each other as do the poles 28 and 34, and seen through the overlapping stator poles are rectangles 37a and 37j which represent the rotor poles and are indicated by letters N and S as having north and south polarity. In the position indicated in FIG. 3a, it is assumed that current is flowing poles in the coil 22 in such a direction as to make poles 26 north with respect to the poles 27, which are, therefore, south poles. However, current in the coil 31 is assumed to be flowing in a direction such that the poles 28 are north poles with respect to the poles 34 which are south poles. There is no anomaly in the fact that the poles 27 are indicated as being south poles and the poles 28, which are attached to the same ferromagnetic disc 24, are indicated as being north poles; the polarity of the poles 27 and 28 is only with reference to their interleaved poles 26 and 34, respectively. If there is any difficulty in comprehending this fact, it may be simplified by imagining the disc 24 to be divided along the line 44 into two separate discs 24a and 24b. Since the disc 24a would be magnetically linked to the coil 22, the flux through the disc 24a would be determined by the current in that coil. Correspondingly, the flux in the disc 24b would be determined by the current flowing in the coil 31 independently of the current flowing in the coil 22.

As shown, there are five poles in each of the sets of stator poles 26, 27, 28 and 34 and these poles are all of substantially equal size and are substantially equally spaced apart. They, therefore, occupy an angular width of not more than approximately 18°. This width may be reduced below 18°, but at the expense of changing the total pole area and therefore the efficiency of the motor. On the other hand, if the center disc 24 is actually divided along the line 44, there is no reason why the angular width of the poles 27 and 28 cannot be increased. In this case, the maximum would arise when each of the poles 27 butted against both of its neighboring poles 26 and each of the poles 28 butted against both of its neighboring poles 34.

Figure 3B:
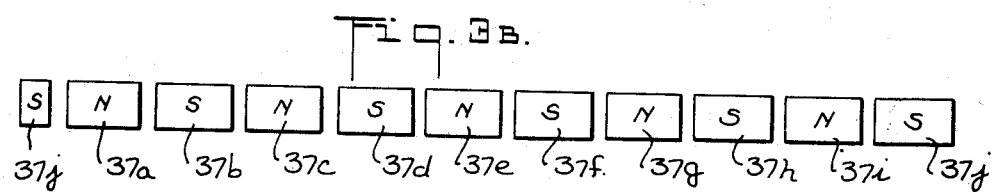
Figure 3C:
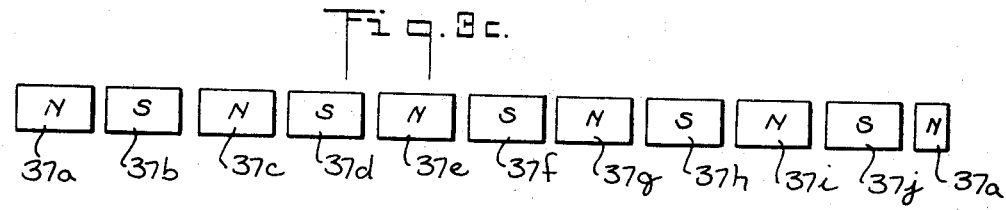
Figure 3D:
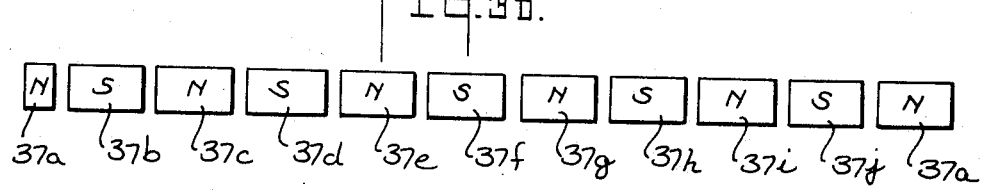

FIG. 3b shows the angular position of the rotor poles 37a–37j for the magnetic polarity illustrated in FIG. 3a. This magnetic polarity would be such that the south poles in sets 27 and 34 would attract the north poles 37a, 37c, 37e, 37g and 37i of the rotor and the north poles of sets 26 and 28 would attract the remaining south poles of the rotor. By reversing the flow of current in the coil 22 but not in the coil 31, the polarity of the poles 26 and 27 would be reversed and this would cause the rotor member 26 to rotate one-half a step. This is indicated in FIG. 3c. Upon a reversal of the current in the coil 31, there would be a further movement of one-half step of the rotor to the position indicated in FIG 3d. Referring again to FIG. 1, this would be required to rotate the rotor shell member 38 enough to move from a position in which one of the numerals on its outer cylindrical surface was displayed through the opening 42 to a position in which the next adjacent numeral was displayed. Whether that next adjacent numeral was the next higher numeral or the next lower numeral would depend upon the sequence of current reversals in the coils 22 and 31, since the rotor revolves with equal ease in either direction.

Figure 4:
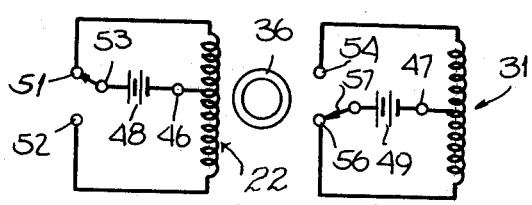
FIG. 4 is a schematic diagram of a basic circuit for operating the motor of FIG. 1 as a stepping motor.

FIG. 4 shows a simplified schematic circuit diagram for operating the motor. As may be seen, the coils 22 and 31 have center-taps 46 and 47, respectively, to facilitate connection to suitable voltage sources 48 and 49. The outer ends of the coil 22 are connected to current supply means, here illustrated as the two terminals 51 and 52 of a single-pole-double-throw switch 53. As is well-known, the supply means might be parts, such as transistors, of a more sophisticated electronic circuit. The coil 31 is similarly connected to terminals 54 and 56 of a switch 57.

Because the coils are center-tapped, only one-half of their turns are used at any instant and it would be possible to improve the efficiency of the motor by operating it so that all of the turns of each of the coils 22 and 31 was in use at each instant. However, this would require means for switching the polarity of current applied to both ends of each coil and it is simpler to switch the polarity between only one end at a time, as shown in FIG. 4.

Figure 5:
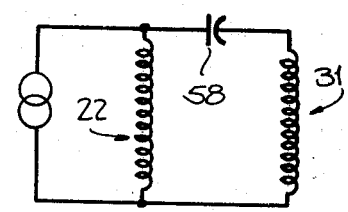
FIG. 5 is a circuit diagram for operating the motor of FIG. 1 from a source of alternating current.

FIG. 5 illustrates the way the motor can be connected to a single phase source of alternating current. In that case, the center-taps 46 and 47 need not be used and a capacitor 58 can be connected in series with one of the coils, for example the coil 31, to produce the necessary current phase shift between the currents in the coils 22 and 31. While the phase shift might not be precisely 90° in such a simple circuit, it could easily be made close enough to that figure to make the motor operative.

FIG. 6 is a cross-sectional view of a motor having the same coils 22 and 31 in the same coil forms 23 and 32, respectively. A first stator pole disc 118, which is similar to the disc 18 of FIG. 1, is parallel and adjacent to one side of the coil form 23 and is attached to the base 11. However, the outer perimeter of the disc 118 does not have individual stator poles extending from it, but instead has a solid cylindrical band 59 which preferably is formed of the same ferromagnetically soft material as the disc 118. The disc has a central aperture and it has a plurality of stator poles extending from the edge of the disc around this central aperture. Two of the poles 126 are indicated in the cross-sectional view of FIG. 6.

As in the embodiment of FIG. 1, the motor of FIG. 6 has a common central ferromagnetically soft disc 124 between the two coil forms 23 and 32 and this central disc also has an aperture and a plurality of stator poles 127 and 128 extending perpendicular to the plane of the disc and equally spaced around its central aperture. A third stator pole disc 133 is adjacent to the other side of the coil form 32 from the disc 124. The disc 133 is similar to the disc 118 and has an outer cylindrical rim 61 extending toward the cylindrical rim 59 to provide a complete outer enclosure for the coils and a complete ferromagnetically soft return path for magnetic flux. The disc 133 has a central aperture with stator poles extending perpendicular to the plane of the disc and interleaved with the poles 128. Several tabs 62 extend from the outer perimeter of the central disc 124 to facilitate alignment of that disc and its poles with respect to the other discs 118 and 133 and their respective stator poles. As may be seen in the drawing, the tabs 62 may be bent over at right angles to the disc 124 to be attached to one of the cylindrical bands, in this case band 61, by means of set screws 63, although other means of correctly placing the disc 124 may be used instead. For example, slots may be formed in facing portions of the edges of the cylindrical bands 59 and 61 and short radial spokes extending from the perimeter of the disc 124 may be fitted into these slots.

The rotor of the motor of FIG. 6 is on the inside of the coils 22 and 31 and includes a permanently magnetized hollow cylinder 136 preferably of barium ferrite material with an even number of north and south poles evenly magnetized around its outer cylindrical surfaces. These poles extend substantially the entire length of the cylinder 136 to cooperate with all of the stator poles 126, 127, 128 and 134. The permanent magnetic material is attachced by a bonding agent 64 to a hub 66 which may be of aluminum or any other suitable material. The hub, in turn, is attached to a shaft 67 which runs in bearings 16 and 17 with an oil reservoir 68 between them. Thrust bearings 69 may be provided in accordance with standard practice.

Since the stator poles 126, 127, 128 and 134 are all formed from material at the center of the discs 118, 124 and 133, it may not be possible for these poles to be rectangular in shape as are the poles of the embodiment of FIG. 1. Instead the poles of the motor of FIG. 6 may be required to be tapered, as shown in FIG. 7. However, the magnetic action of these poles is the same as that of the poles in the embodiment of FIG. 1. Each of the poles 126 is equally spaced between two of the poles 127 and each of the poles 128 is equally spaced between two of the poles 134. The sets of poles 128 and 134 are offset with respect to the sets of poles 126 and 127 90° electrically.

In the motor of FIG. 6 and FIG. 7 a different number of poles is shown than in the motor of FIG. 1. However, the number of poles is not to be considered as being a limitation on the invention; either the embodiment of FIG. 1 or FIG. 6 could be made with more or less poles than is shown.

FIG. 8 shows a modified embodiment of the motor constructed on lines generally similar to the motor in FIG. 6. In the motor of FIG. 8 the shaft 67 is supported in two bearings 16 and 17 in a tubular part of a base 11. Between the bearings 16 and 17 is an oil reservoir 68 and between the bearing 17 and a radial member 164 that supports rotor 236 are two thrust bearings 69.

The rotor 236 is a hollow permanently magnetized ferrite cylinder having a plurality of north and south magnetized pole sections evenly spaced around its perimeter to form elongated magnetic poles each of which corresponds substantially the full length of the rotor. The poles are divided equally into north and south poles evenly spaced apart and a common number of such poles is 12 north and 12 south.

The stator section of the motor comprises two substantially separate parts. The part nearer the base 11 includes an annular disc 218 having a plurality of evenly spaced stator poles 226 extending from its inner perimeter substantially parallel to the axis of the motor. If there are 12 south poles in the rotor 236 there are 12 of the poles 226. The annular disc 218 is matched by another disc 224 which has the same number of stator poles 227 extending from its inner perimeter and interleaved with the poles 226 so that each of the poles 226 is evenly spaced from the two poles 227 on each side of it. Thus, in the embodiment under consideration, there would be 12 poles 227. Between the two annular discs 218 and 224 is a coil 122 which is actually two coils that may be center-tapped or wound as separate coils, for example by means of a bifilar, or two-in-hand, winding. This coil is wound on an insulating bobbin 23 to fit snugly in place between the discs 218 and 224 and around the finger-like salient poles 226 and 227.

The stator section just described is substantially duplicated by a second section comprising two annular discs 233 and 225 that correspond to the discs 218 and 224, respectively. The disc 233 has the same number of salient stator poles 234 extending inwardly from its inner perimeter as the number of poles on the disc 218 and the disc 225 has the same number of poles 228 extending from its inner perimeter as the number of poles 227. Between the discs 225 and 233 is another split or center-tapped coil 131 similar to or, more normally, identical with the coil 122 except that the coil 131 is not wound on an insulating bobbin but is wound on a conductive bobbin 132 which may be made of highly conductive material such as copper.

The entire motor is enclosed in a housing 71, the cylindrical part of which forms a magnetic return path between the outer perimeters of the discs 218 and 224 and the discs 225 and 233.

FIGS. 9a and 9b show two of the possible ways of connecting the coils in the motor in FIG. 8. The coil 122 in FIG. 9a is shown to be divided into two portions 122a and 122b. Portion 122a has terminals 122c and 122d while the portion 122b has terminals 122e and 122f. The coil 131 is similarly divided into two sections 131a and 131b with terminals 131c and 131d for section 131a and terminals 131e and 131f for section 131b. The circles superimposed on the schematic indications of the coils 131a and 131b indicate that these coils have shading rings and in this case the shading ring is the conductive coil form 132.

The terminals 131d and 131f at the outer ends of the serially connected coils 131 and 122 are connected to two contacts 72 and 73 of a vibrating switch having a moving armature 74. The armature is connected to one terminal of a battery 176, the other terminal of which is connected to the center of the coils which in this case is the terminals 122c and 122e. As the armature 74 vibrates back and forth between the contacts 72 and 73 a pulsating current is developed which energizes the coil sections 131a and 122a at one time and the coil sections 131b and 122b at another time. However, because of the shading ring formed by the coil bobbin 132, the magnetic flux produced by the current in the coil section 122a is not simultaneous with the magnetic flux produced by current flowing in the coil 131a. The difference in timing between the magnetic fluxes, which is equivalent to a difference in phase, produces the same effect as a rotating field which acts upon the permanently magnetized rotor 236 to cause it to step from one position to the next. This stepping is carried on when the armature 74 shifts to the other contact 73 to energize the coils 122b and 131b.

The circuit in FIG. 9b differs from that in FIG. 9a only in that the terminals of the coil sections 131a and 131b have been reversed. The effect of this reversal is to reverse the direction of rotation of the rotor 236 and it should be noted that this reversal of rotation can only be produced by reversing the connections of the coil sections 131a and 131b and not by reversal of the coil sections 122a and 122b.

FIGS. 10a and 10b show the motor of FIG. 8 connected as a single-phase shaded pole motor with all of the coil sections again connected in series but without making use of any central terminals. The effective terminals across which an alternating current from a source 77 is connected are the terminals 131d and 122f. Again the circle superimposed on the coil sections 131a and 131b indicates that these coils are subject to shading by the conductive bobbin 132 to produce a flux which is out of phase with respect to the coil sections 122a and 122b.

The direction of rotation of the rotor can be reversed by reversing either of the coils 122 or 131. FIG. 10 shows this condition in which the coil 131 has been reversed so that the terminals across which the alternating current from the source 77 is connected are the terminals 131f and 122f.

The phase displacement caused by the shading ring is less than 90° electrically but preferably the poles 228 and 234 are displaced 90° mechanically from the poles 227 and 226. This 90° mechanical displacement is calculated on the basis that the angular distance from one pole 228 to its next adjacent neighboring pole 234 is 180° both electrically and mechanically and half of than angular distance is 90°. It would be possible to orient the two stator sections so that the poles 228 were angularly displaced from the poles 227 by 70° mechanically to correspond to the approximately 70° difference in phase of the magnetic flux produced by the coils 122 and 131 but then the motor would be less efficient if connected to run in the reverse direction. With the 90° mechanical spacing between the poles 227 and 228 the motor runs equally well in either direction.

While this invention has been described in terms of a specific embodiment, it will be obvious to those skilled in the art that modifications may be made therein without departing from the true scope of the invention as defined by the following claims.

What is claimed is:

1. A motor comprising: first and second coils mounted on a common axis; first claw tooth stator means comprising first ferromagnetically soft disc means at one end of said first coil and a first set of substantially equally spaced stator poles around said first coil extending parallel to said axis and magnetically linked to said first coil by said first ferromagnetically soft means; second claw tooth stator means comprising second ferromagnetically soft disc means between said coils, a second set of substantially equally spaced stator poles extending from said second disc means parallel to said axis and equal in number to said first set and interleaved therewith and magnetically linked to said first coil by said second ferromagnetically soft means to have a magnetic polarity opposite the magnetic polarity of said first set when current flows in said first coil and a third set of substantially equally spaced stator poles around said second coil and extending from said second ferromagnetically soft means axially in the opposite direction from said second set to be magnetically linked by said second ferromagnetically soft means to said second coil; third claw tooth stator means comprising third ferromagnetically soft disc means on the opposite end of said second coil from said second claw tooth stator means and a fourth set of substantially equally spaced stator poles extending parallel to said axis and equal in number to said third set and interleaved therewith and magnetically linked by said third ferromagnetically soft means to said second coil to have the opposite magnetic polarity from said third set of stator poles when current flows through said second coil, said poles of said third set being angularly spaced approximately 90° electrically from poles of said first set; and a rotor axially overlapping all of said sets of stator poles and having an even number of magnetic poles permanently magnetized in a closed band, the total number of magnetic poles in said rotor being equal to the total number of stator poles in said first and second sets, said poles of said rotor being spaced alternately north and south around said band.

2. A motor comprising: first and second hollow torroidal coils mounted on a common axis; first claw tooth stator means comprising first ferromagnetically soft means in the form of a first annular disc at one end of said first coil and first set of substantially equally spaced stator poles around said first coil extending from the inner rim of said first annular disc into the central opening in said coil parallel to said axis and magnetically linked to said first coil by said first ferromagnetically soft means; second claw tooth stator means comprising second ferromagnetically soft means in the form of second and third annular discs in surface-to-surface contact between said coils, a second set of substantially equally spaced stator poles extending from the inner rim of said second annular disc into the central opening of said first coil and parallel to said axis and equal in number to said first set and interleaved therewith and magnetically linked to said first coil by said second ferromagnetically soft means to have a magnetic polarity opposite the magnetic polarity of said first set when current flows in said first coil, and a third set of substantially equally spaced stator poles around said second coil and extending from the inner rim of said third disc into the central opening of said second coil parallel to said axis and in the opposite direction from said second set of stator poles to be magnetically coupled by second ferromagnetically soft means to said second coil; third clay tooth stator means comprising third ferromagnetically soft means in the form of a fourth annular disc on the opposite end of said second coil from said second claw tooth stator means, said third means comprising a fourth annular disc, a fourth set of substantially equally spaced stator poles extending from the inner rim of said fourth annular disc and equal in number to said third set and interleaved therewith and magnetically linked by said third ferromagnetically soft means to said second coil to have the opposite magnetic polarity from said third set of stator poles when current flows through said second coil, said poles of said third set being angularly spaced approximately 90° electrically from poles of said first set; and a rotor axially overlapping all of said sets of stator poles and having an even number of permanent magnetic poles spaced alternately north and south, each north pole being angularly separated from each south pole by an amount commensurate with the angular spacing between stator poles of said first and second sets.

3. A motor comprising: first and second coils mounted on a common axis; a first ferromagnetically soft annular ring on one side of said first coil; a first set of substantially equally spaced stator poles extending from one edge of said first ring and magnetically linked by said ring to said first coil; a second ferromagnetically soft annular ring between said coils; a second set of substantially equally spaced stator poles extending from said second ring and interleaved with said first set, said second set of stator poles being magnetically linked by said second ring to said first coil to have a magnetic polarity opposite the magnetic polarity of said first set when a net current flows in one direction in said first coil; a third ferromagnetically soft annular ring on the opposite side of said second coil from said second ring; a third set of substantially equally spaced stator poles around said third ring and magnetically linked by said third ring to said second coil; a fourth set of substantitally equally spaced stator poles around said second ring and interleaved with said third set, said fourth set of stator poles being magnetically linked by said second ring to said second coil to have the opposite magnetic polarity from said third set when a net current flows in one direction in said second coil, poles of said third set being angularly spaced approximately an odd multiple of 90° electrically from poles of said first set; and a rotor having permanent magnetic poles spaced alternately north and south, each north pole being angularly spaced from each south pole by an amount commensurate with the angular spacing between stator poles of said first and second sets.

4. The motor of claim 3 in which all of said stator poles extend from the outer edges of said rings.

5. The motor of claim 3 in which each of said sets has the same number of stator poles.

6. The motor of claim 3 comprising, in addition, a conductive bobbin, one of said coils being wound on said conductive bobbin.

7. The motor of claim 4 in which there are twice as many poles in said rotor as in one of said sets of strator poles.

8. The motor of claim 5 in which all of said stator poles are of substantially equal angular widths.

9. The motor of claim 8 in which all of said stator poles lie in substantially the same cylindrical surface.

10. The motor of claim 9 in which each of said stator poles has an angular width of slightly less than 18° mechanically.

11. The motor of claim 6 in which both of said coils are center-tapped.

12. The motor of claim 6 in which both of said coils comprise two separate windings.

13. A counter motor comprising: substantially identical first and second center-tapped, cylindrical, bobbin-wound coils; a common cylindrical ferromagnetically soft steel core extending through both of said coils on which both of said coils are mounted side by side; a central ferromagnetically soft steel disc mounted on said core between said coils and having a first set of N equally spaced stator poles extending substantially perpendicular to the perimeter of said disc across the outer cylindrical surface of said first coil and a second set of poles substantially equal in number, size, and shape to said first set but extending in the opposite direction from said first set and across the outer cylindrical surface of said second coil; a second disc attached to said core adjacent to said first coil but on the opposite side thereof from said first disc and having N substantially equally spaced stator poles extending from the perimeter thereof across the outer cylindrical surface of said first coil in the direction of said first disc, each of said poles of said second disc being substantially midway between adjacent poles of said first set; a third disc attached to said core adjacent to said second coil on the opposite side thereof from said first disc and having N substantially equally spaced poles extending from the perimeter thereof across the outer cylindrical surface of said second coil in the direction of said first disc, each of the poles of said third disc being substantially midway between adjacent poles of said second set, the poles of said second set being angularly spaced by about 90° electrically from the poles of said first set; a shaft extending axially through said core and journaled for rotation therein; a rotor comprising a flange at one end of said shaft adjacent to said third disc, and a permanently magnetized cylindrical member having an inner diameter slightly larger than the outer diameter of said stator poles and an axial length substantially equal to the axial length of both of said coils, said cylindrical member having N north magnetic and N south magnetic poles and substantially equal angular dimensions substantially equally spaced around its inner cylindrical surface.

14. The motor of claim 13 comprising: N equally spaced indicia on the outer cylindrical surface of said rotor.

15. The motor of claim 13, in which said cylindrical member of said rotor comprises an outer rigid cylindrical shell and an inner cylindrical band of ferrite material permanently magnetized with N north magnetic poles and N south magnetic poles of substantially equal dimensions and substantially equally spaced apart.

16. The motor of claim 15 in which said ferrite material is flexible.

17. The motor of claim 15 in which said ferrite material is ceramic.

18. A counter motor comprising: substantially identical first and second center-tapped cylindrical coils; a common cylindrical ferromagnetically soft steel core extending through both of said coils on which both of said coils are mounted side by side; a central ferromagnetically soft steel disc mounted on said core between said coils and having a diameter substantially equal to the diameter of said coils and having a first set of five equally spaced stator poles extending substantially perpendicular to the perimeter of said disc across the outer cylindrical surface of said first coil and a second set of poles substantially equal in number, size, and shape to said first set but extending in the opposite direction from said first set and across the outer cylindrical surface of said second coil; a second disc substantially equal in diameter to said first disc and attached to said core adjacent to said first coil but on the opposite side thereof from said first disc and having five substantially equally spaced stator poles extending from the perimeter thereof across the outer cylindrical surface of said first coil in the direction of said first disc, each of said poles of said second disc being substantially midway between adjacent poles of said first set; a third disc substantially equal in diameter to said second disc and attached to said core adjacent to said second coil on the opposite side thereof from said first disc and having five substantially equally spaced poles extending from the perimeter thereof across the outer cylindrical surface of said second coil in the direction of said first disc, each of the poles of said third disc being substantially midway between adjacent poles of said second set, the poles of said second set being angularly spaced by about 90° electrically from the poles of said second set; a shaft extending axially through said core and journaled for rotation thereon; a rotor comprising a flange at one end of said shaft adjacent to said third disc, and a permanently magnetized cylindrical member having an inner diameter slightly larger than the outer diameter of said stator poles and an axial length substantially equal to the axial length of both of said coils, said cylindrical member having five north magnetic and five south magnetic poles and substantially equal angular dimensions substantially equally spaced around its inner cylindrical surface.

19. The motor of claim 18 comprising ten equally spaced digits on the outer cylindrical surface of said rotor.

20. A motor comprising: first and second coils mounted on a common axis; a first ferromagnetically soft annular ring on one side of said first coil; a first set of substantially equally spaced stator poles extending from the inner edge of said first ring and magnetically linked by said ring to said first coil; a second ferromagnetically soft annular ring between said coils; a second set of substantially equally spaced stator poles extending from the inner edge of said second ring and interleaved with said first set, said second set of stator poles being magnetically linked by said second ring to said first coil to have a magnetic polarity opposite the magnetic polarity of said first set when a net current flows in one direction in said first coil; a third ferromagnetically soft annular ring on the opposite side of said second coil from said second ring; a third set of substantially equally spaced stator poles around said third ring and extending from the inner edge thereof and magnetically linked by said third ring to said second coil; a fourth set of substantially equally spaced stator poles around said second ring and extending from the inner edge thereof and interleaved with said third set, said fourth set of stator poles being magnetically linked by said second ring to said second coil to have the opposite magnetic polarity from said third set when a net current flows in one direction in said second coil, poles of said third set being angularly spaced approximately an odd multiple of 90° electrically from poles of said first set; and a rotor having permanent magnetic poles spaced alternately north and south, each north pole being angularly spaced from each south pole by an amount commensurate with the angular spacing between stator poles of said first and second sets.

References Cited

UNITED STATES PATENTS

| | | | |
|---|---|---|---|
| 2,070,447 | 2/1937 | Morrill | 310—164 |
| 2,292,265 | 8/1942 | Carpenter | 310—164 |
| 2,539,144 | 1/1951 | Kuhlmann | 310—164 |
| 2,548,633 | 4/1951 | Stephenson | 310—164 |
| 2,981,855 | 4/1961 | Van Lieshout | 310—163 |
| 3,205,383 | 9/1965 | Hurst | 310—162 |
| 3,238,399 | 3/1966 | Croymans et al. | 310—46 |

FOREIGN PATENTS 904,071  7/1949  Germany.

WARREN E. RAY, Primary Examiner

U.S. Cl. X.R.

310—67, 156, 164, 257; 340—325, 379